United States Patent
Chen

(10) Patent No.: US 11,309,821 B2
(45) Date of Patent: Apr. 19, 2022

(54) BRUSHLESS DC MOTOR CONTROL DEVICE FOR CEILING FAN

(71) Applicant: AIR COOL INDUSTRIAL CO., LTD., Taichung (TW)

(72) Inventor: Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 64 days.

(21) Appl. No.: 16/883,691

(22) Filed: May 26, 2020

(65) Prior Publication Data

US 2021/0376779 A1 Dec. 2, 2021

(51) Int. Cl.
*H02P 27/04* (2016.01)

(52) U.S. Cl.
CPC .................................. *H02P 27/04* (2013.01)

(58) Field of Classification Search
CPC ........ H02P 27/04; H02H 1/0007; H02H 3/06; H02H 3/08; H02H 3/087; H02H 7/26; H02H 7/268; H02H 9/02; H02H 9/08; H03K 17/18
See application file for complete search history.

(56) References Cited

U.S. PATENT DOCUMENTS

| 4,499,408 | A | * | 2/1985 | Bitting | ...................... H02P 6/30 |
| | | | | | 318/400.04 |
| 5,541,584 | A | * | 7/1996 | Mehta | ............... H02J 13/00009 |
| | | | | | 340/12.32 |
| 5,986,495 | A | * | 11/1999 | Chen | ...................... H05B 47/10 |
| | | | | | 327/447 |
| 9,048,769 | B2 | * | 6/2015 | Ohgushi | ................. H02P 6/182 |
| 10,103,676 | B2 | * | 10/2018 | Tseng | ......................... H02P 6/16 |
| 2008/0218108 | A1 | * | 9/2008 | Niikura | ..................... H02P 6/08 |
| | | | | | 318/400.17 |

* cited by examiner

*Primary Examiner* — Bickey Dhakal
(74) *Attorney, Agent, or Firm* — Pai Patent & Trademark Law Firm; Chao-Chang David Pai

(57) ABSTRACT

A brushless DC motor control device for a ceiling fan is electrically connected to a brushless DC motor and includes at least one switch, a processor, and a driving module. The processor includes at least one detection module and a processing module. The switch transmits a switch signal to the detection module for detection. After the detection module detects an operating electric potential and a normal electric potential of the switch signal, the detection module outputs a detection signal to the processing module. The processing module outputs a control signal to the driving module, so that the driving module transmits a driving signal to the brushless DC motor to control the rotational speed, stop and rotational direction of the brushless DC motor.

4 Claims, 11 Drawing Sheets

BRUSHLESS DC MOTOR CONTROL DEVICE FOR CEILING FAN

FIELD OF THE INVENTION

The present invention relates to a control device, and more particularly, to a brushless DC motor control device for a ceiling fan.

BACKGROUND OF THE INVENTION

As shown in FIG. 1, a conventional ceiling fan control system comprises a switch module 1. The switch module 1 includes a switch body 2. The switch body 2 is connected to a power supply 3. The switch body 2 is selectively set as a power-off mode L or selectively connected to one of a first wire connecting member 4, a second wire connecting member 5 and a third wire connecting member 6. The second wire connecting member 5 is provided with a forward diode 7. The third wire connecting member 6 is provided with a reverse diode 8. The first wire connecting member 4, the second wire connecting member 5 and the third wire connecting member 6 are connected to a control panel 9. The control panel 9 is further connected to a ceiling fan brushless motor 10. The control panel 9 comprises a first detector 11, a second detector 12, a microcontroller unit 13, and a motor driving unit 14. The current inputted directly into the first wire connecting member 4 from the power supply by the switch body 2 and then outputted is a sine wave. The current inputted into the second wire connecting member 5 through the forward diode and then outputted is a positive half cycle. The current passing through the third wire connecting member 6 and outputted from the reverse diode 8 is a negative half cycle. When the switch body 2 is switched to selectively connect the first wire connecting member 4, the second wire connecting member 5 or the third wire connecting member 6, the outputted current flowing through the electronic components (hardware) of the above wire connecting members is detected and determined by the first detector 11 and second detector 12, and a detected signal is transmitted to the microcontroller unit 13, and the microcontroller unit 13 will transmit a high, mid, or low control signal to the motor driving unit 14, and the motor driving unit 14 controls the rotational speed of the ceiling fan brushless motor 10.

However, due to the limitation of the number and types of hardware of the electronic components of the above-mentioned wire connecting members, the switch body 2 in cooperation with the above-mentioned wire connecting members can only generate three current waveforms, so that the microcontroller unit 13 can only select a high, mid, or low control signal for the rotational speed of the ceiling fan, unable to select more control signals for the rotational speed of the ceiling fan. Accordingly, the inventor of the present invention has devoted himself based on his many years of practical experiences to solve these problems.

SUMMARY OF THE INVENTION

The primary object of the present invention is to provide a brushless DC motor control device for a ceiling fan, which can increase the phases to control the rotational speed of the brushless DC motor of the ceiling fan, so as to increase the convenience of use.

In order to achieve the aforesaid object, a brushless DC motor control device for a ceiling fan is provided. The brushless DC motor control device is electrically connected to a brushless DC motor. The brushless DC motor control device comprises at least one switch, a processor, and a driving module. The switch has a switch signal. When the switch is not actuated, the electric potential of the switch signal is a normal electric potential. When the switch is actuated, the electric potential of the switch signal is an operating electric potential. The processor includes at least one detection module and a processing module. The detection module is electrically connected to the switch and the processing module. The switch transmits the switch signal to the detection module. The detection module has a detection signal. The detection module transmits the detection signal to the processing module. The processing module has a control signal. The processing module outputs the control signal according to the detection signal of the detection module. The driving module is electrically connected to the processing module and the brushless DC motor. The processing module transmits the control signal to the driving module. The driving module has a driving signal. The driving module outputs the driving signal according to the control signal. The driving module transmits the driving signal to the brushless DC motor. The driving signal is used to control a rotational speed, stop and rotational direction of the brushless DC motor.

In the brushless DC motor control device provided by the present invention, the switch sends the switch signal to the detection module for detection. After the detection module detects the operating electric potential and the normal electric potential of the switch signal, the detection module outputs the detection signal to the processing module. The processing module outputs the control signal to the driving module according to the detection signal of the detection module, so that the driving module transmits the driving signal to the brushless DC motor to control the rotational speed, stop and rotational direction of the brushless DC motor. There is no upper limit on the phases to control the rotational speed of the brushless DC motor, so as to increase the convenience of use.

DETAILED DESCRIPTION OF THE PREFERRED EMBODIMENTS

Embodiments of the present invention will now be described, by way of example only, with reference to the accompanying drawings.

Figure 1:
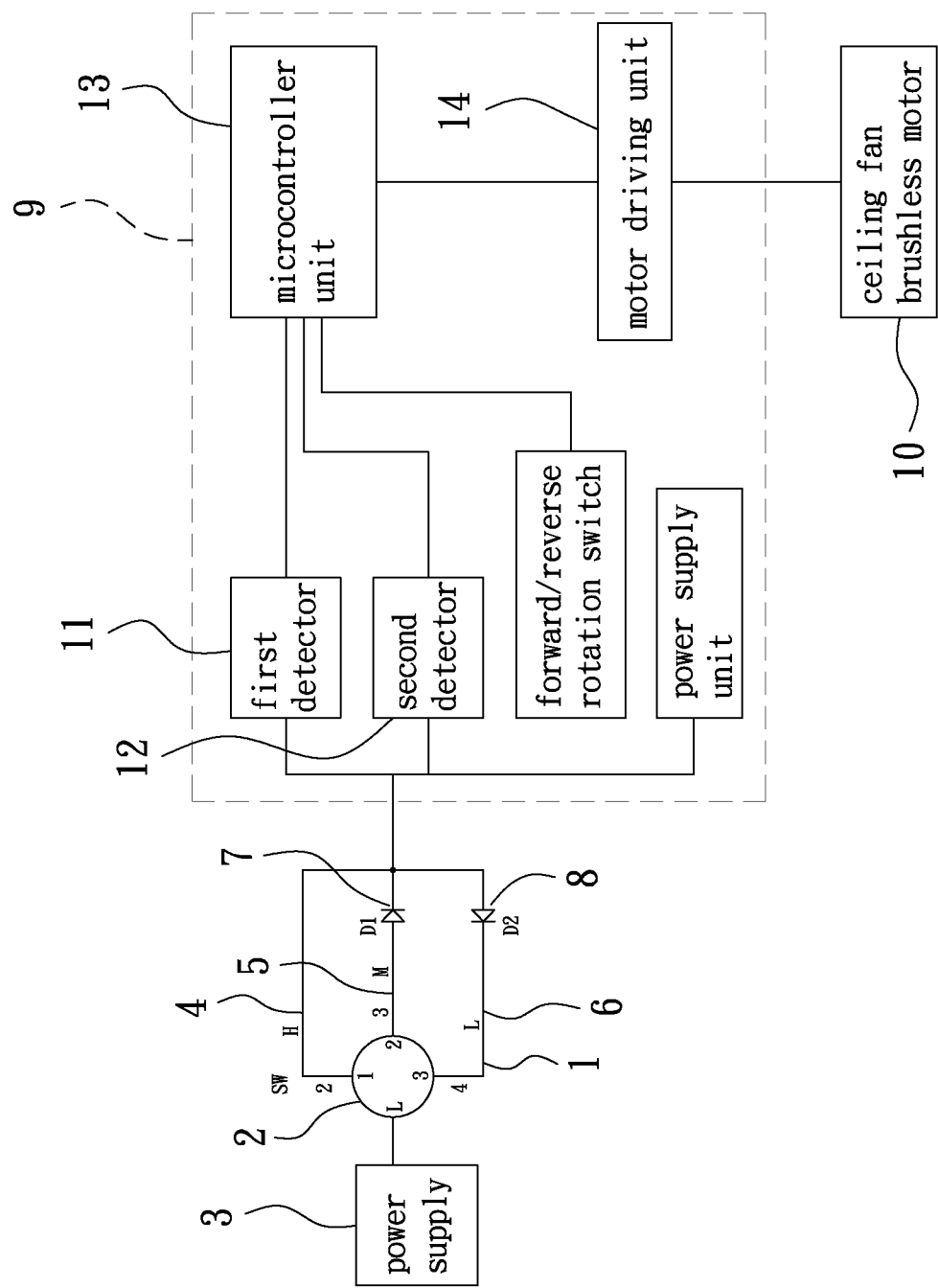
FIG. 1 is a block diagram of a conventional ceiling fan control system.
Figure 2:
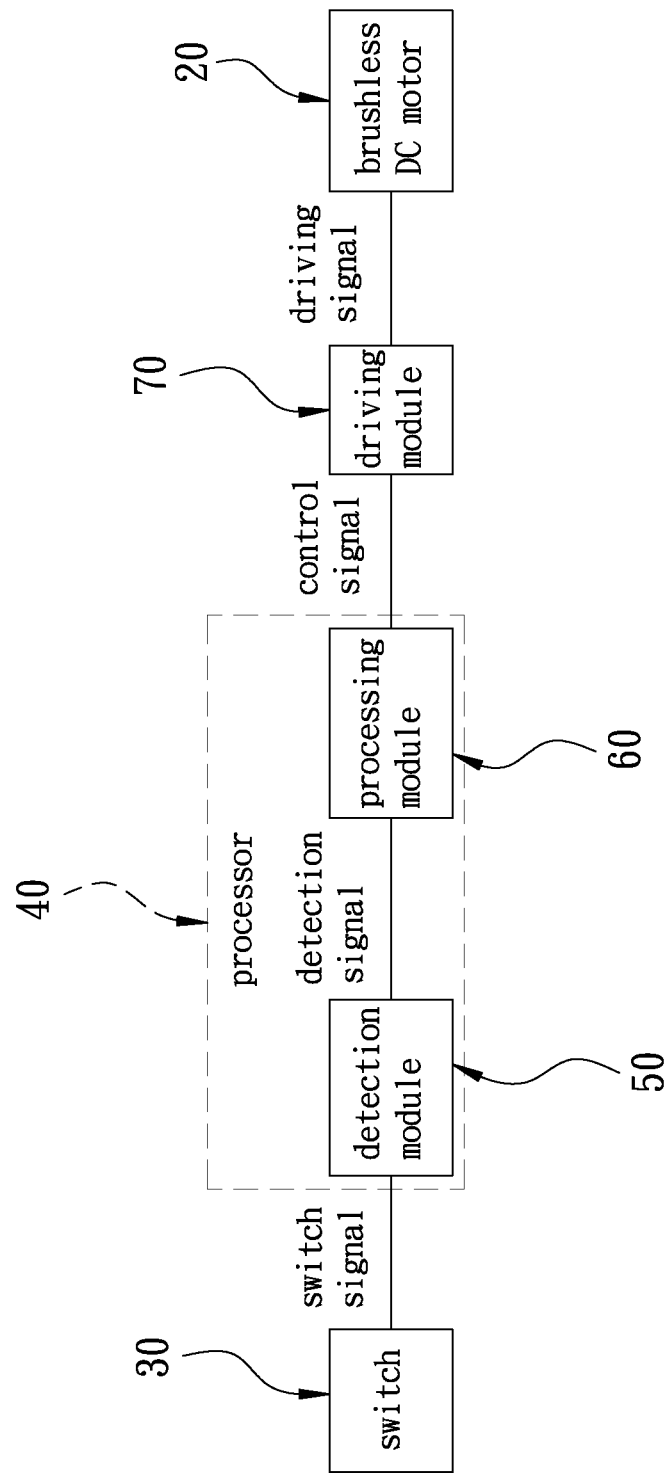
FIG. 2 is a block diagram according to a first embodiment of the present invention.

FIG. 2 is a block diagram according to a first embodiment of the present invention. The present invention discloses a brushless DC motor control device for a ceiling fan. The brushless DC motor control device is electrically connected to a brushless DC motor 20, and comprises at least one switch 30, a processor 40, and a driving module 70.

Figure 3:
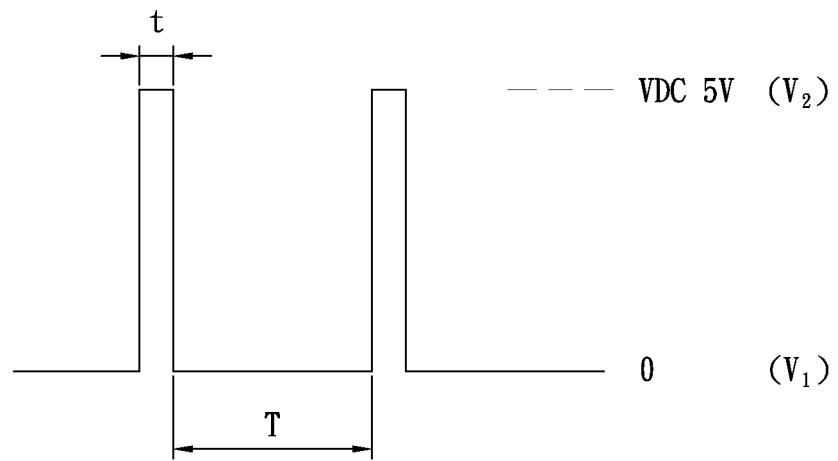
FIG. 3 is a schematic diagram of the waveform of the switch signal of the present invention, taking a normally open pull switch as an example.
Figure 4:
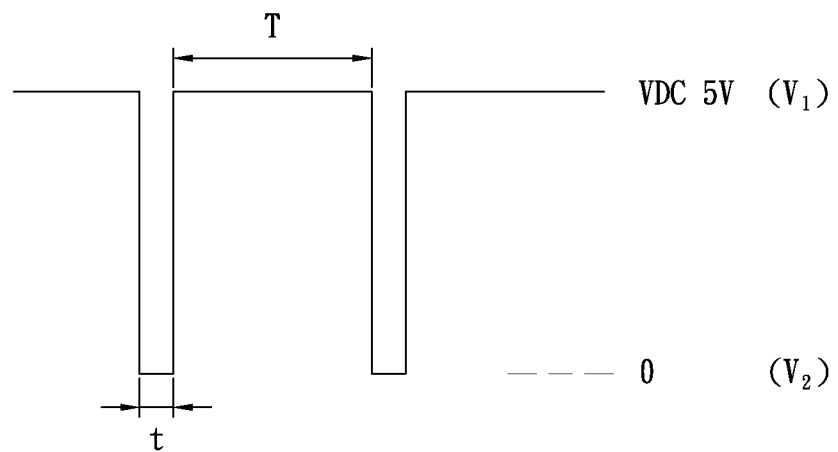
FIG. 4 is a schematic diagram of the waveform of the switch signal of the present invention, taking a normally closed pull switch as an example.

The switch 30 has a switch signal. FIG. 3 is a schematic diagram of the waveform of the switch signal of the present invention, taking a normally open pull switch as an example. FIG. 4 is a schematic diagram of the waveform of the switch signal of the present invention, taking a normally closed pull switch as an example. When the switch 30 is not actuated, the electric potential of the switch signal is a normal electric potential V1. When the switch 30 is actuated, the electric potential of the switch signal is an operating electric potential V2. The switch 30 may be connected to a DC power supply or an AC power supply. When the switch 30 is connected to an AC power supply, the switch 30 outputs the switch signal by connecting an analog-to-digital converter 80 (not shown in FIG. 2).

The processor 40 includes at least one detection module 50 and a processing module 60. The detection module 50 is electrically connected to the switch 30 and the processing module 60. The switch 30 transmits the switch signal to the detection module 50. The detection module 50 has a detection signal. The detection module 50 is configured to detect the switch signal to output the detection signal. The detection module 50 transmits the detection signal to the processing module 60. The processing module 60 has a control signal. The processing module 60 outputs the control signal according to the detection signal of the detection module 50.

The driving module 70 is electrically connected to the processing module 60 and the brushless DC motor 20. The processing module 60 transmits the control signal to the driving module 70. The driving module 70 has a driving signal. The driving module 70 transmits the driving signal to the brushless DC motor 20. The driving signal is used to control the rotational speed, stop and rotational direction of the brushless DC motor 20.

The switch 30 sends the switch signal to the detection module 50 for detection when it is not actuated and when it is actuated. After the detection module 50 detects the operating electric potential V2 and the normal electric potential V1 of the switch signal, the detection module 50 outputs the detection signal to the processing module 60. The processing module 60 outputs the control signal to the driving module 70 according to the detection signal of the detection module 50, so that the driving module 70 transmits the driving signal to the brushless DC motor 20 to control the rotational speed, stop and rotational direction of the brushless DC motor 20. All the embodiments of the present invention have the advantage that there is no upper limit on the phases to control the rotational speed of the brushless DC motor 20.

Figure 5:
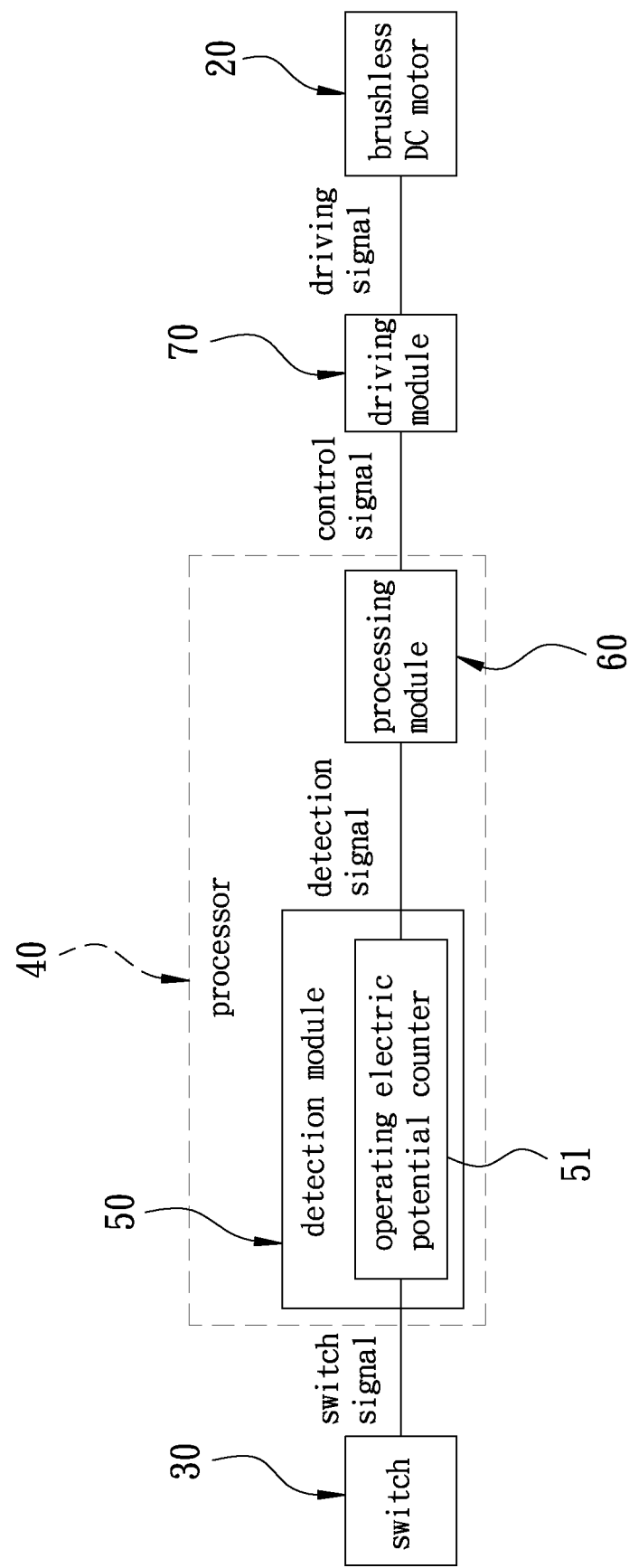
FIG. 5 is a block diagram according to a second embodiment of the present invention.

FIG. 5 is a block diagram according to a second embodiment of the present invention. The second embodiment of the present invention differs from the first embodiment in that the detection module 50 includes an operating electric potential counter 51. The operating electric potential counter 51 is configured to detect and count the number of times the operating electric potential V2 of the switch signal appears. The operating electric potential counter 51 is electrically connected to the switch 30 and the processing module 60. The detection signal includes the detection result of the operating electric potential counter 51. Thereby, the processing module 60 outputs the control signal to the driving module 70 according to the number of times the operating electric potential V2 appears in the detection result of the detection signal, so as to control the rotational speed, stop or rotational direction of the brushless DC motor 20.

Figure 6:
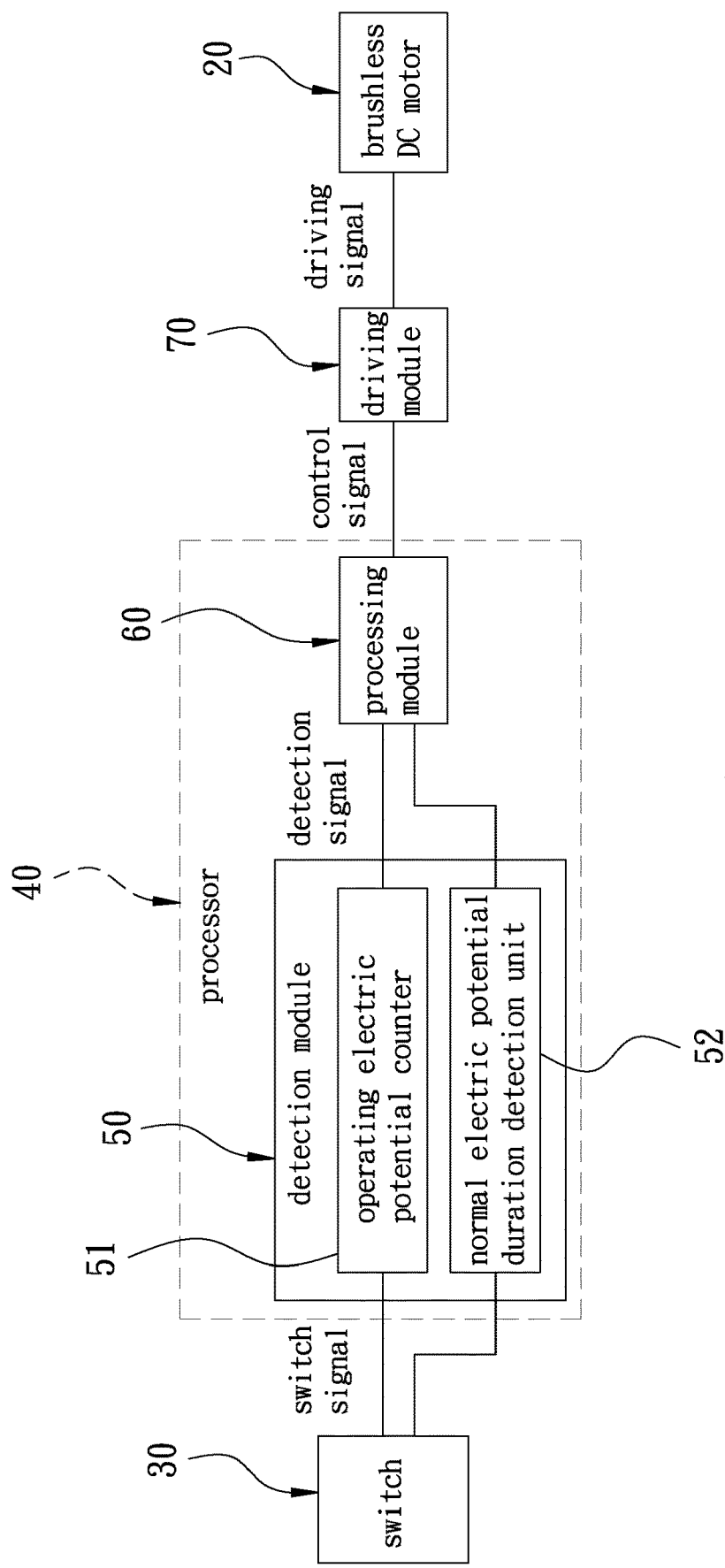
FIG. 6 is a block diagram according to a third embodiment of the present invention.

FIG. 6 is a block diagram according to a third embodiment of the present invention. The third embodiment of the present invention differs from the second embodiment in that the detection module 50 further includes a normal electric potential duration detection unit 52. The normal electric potential duration detection unit 52 is configured to detect and time the duration of each normal electric potential V1 of the switch signal. The normal electric potential duration detection unit 52 is electrically connected to the switch 30 and the processing module 60. The detection signal includes the detection result of one or a combination of the operating electric potential counter 51 and the normal electric potential duration detection unit 52. Thereby, the processing module 60 outputs the control signal to the driving module 70 according to one or a combination of the number of times the operating electric potential V2 appears and the duration of each normal electric potential V1 in the detection result of the detection signal, so as to control the rotational speed, stop or rotational direction of the brushless DC motor 20.

Figure 7:
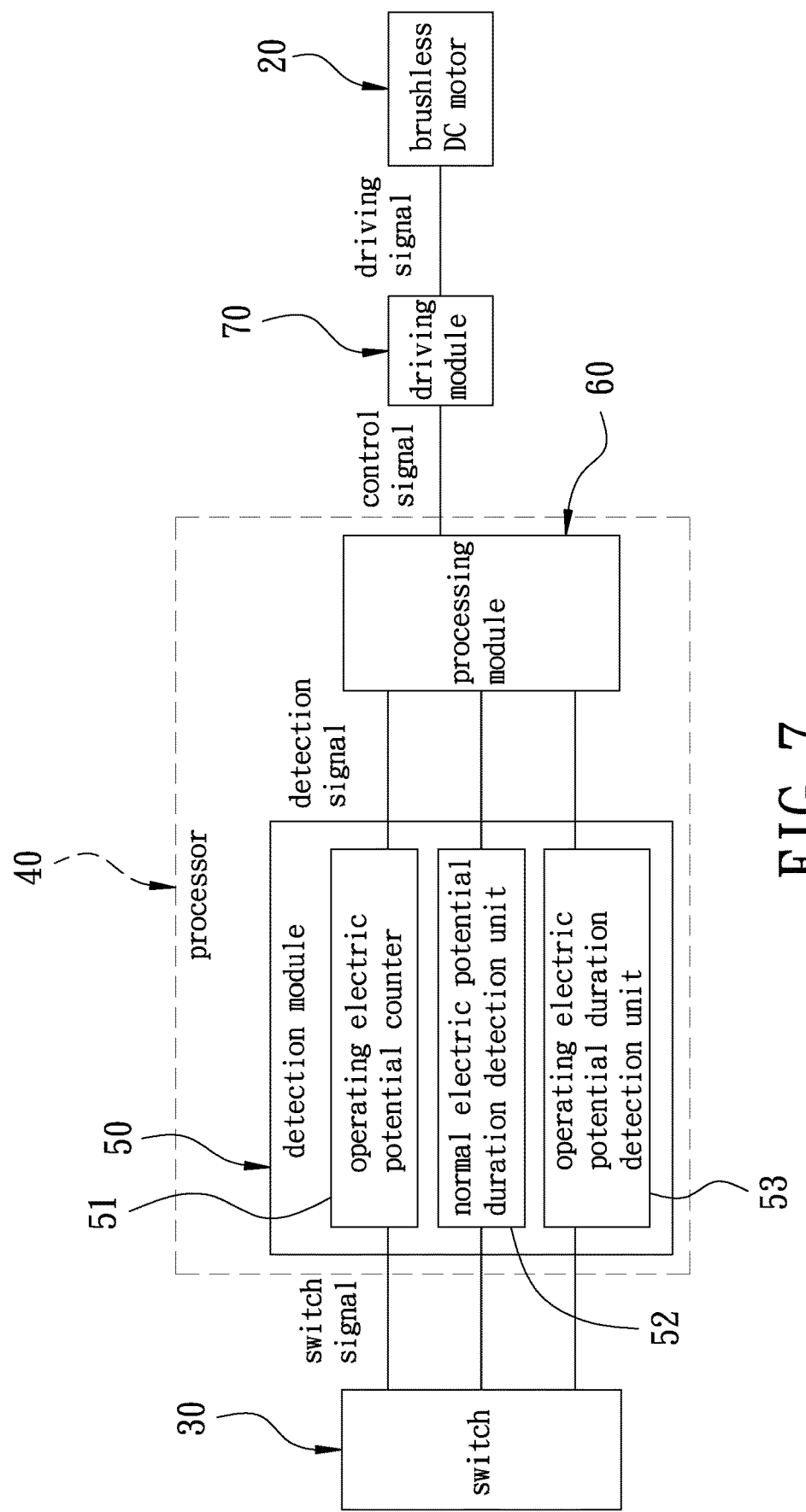
FIG. 7 is a block diagram according to a fourth embodiment of the present invention.

FIG. 7 is a block diagram according to a fourth embodiment of the present invention. The fourth embodiment of the present invention differs from the third embodiment in that the detection module 50 further includes an operating electric potential duration detection unit 53. The operating electric potential duration detection unit 53 is configured to detect and time the duration of each operating electric potential V2 of the switch signal. The operating electric potential duration detection unit 53 is electrically connected to the switch 30 and the processing module 60. The detection signal includes the detection result of one or a combination of the operating electric potential counter 51, the normal electric potential duration detection unit 52 and the operating electric potential duration detection unit 53. Thereby, the processing module 60 outputs the control signal to the driving module 70 according to one or a combination of the number of times the operating electric potential V2 appears, the duration of each normal electric potential V1 and the duration of each operating electric potential V2 in the detection result of the detection signal, so as to control the rotational speed, stop or rotational direction of the brushless DC motor 20.

Figure 8:
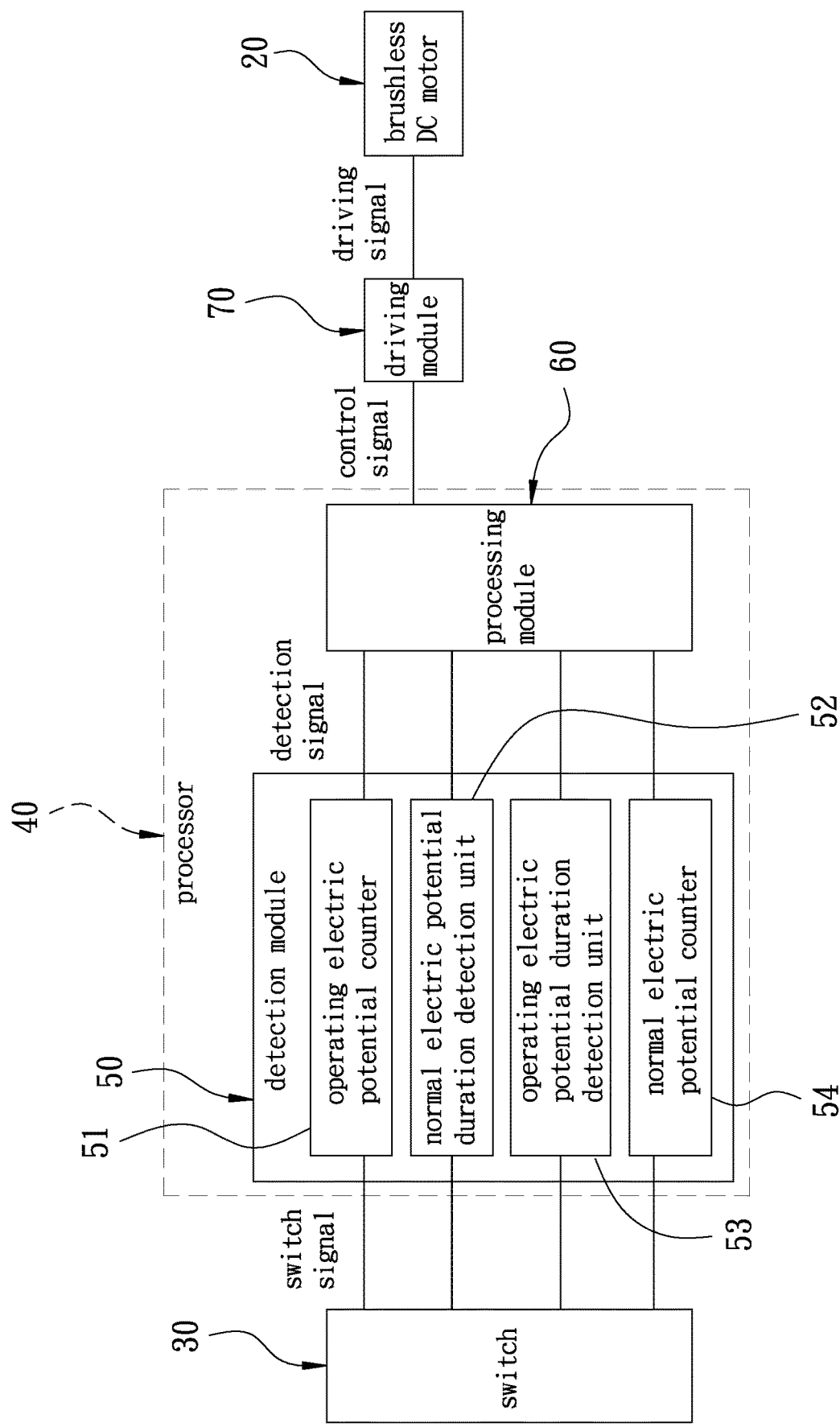
FIG. 8 is a block diagram according to a fifth embodiment of the present invention.

FIG. 8 is a block diagram according to a fifth embodiment of the present invention. The fifth embodiment of the present invention differs from the fourth embodiment in that the detection module 50 further includes a normal electric potential counter 54. The normal electric potential counter 54 is configured to detect and count the number of times the normal electric potential V1 of the switch signal appears. The normal electric potential counter 54 is electrically connected to the switch 30 and the processing module 60. The detection signal includes the detection result of one or a combination of the operating electric potential counter 51, the normal electric potential duration detection unit 52, the operating electric potential duration detection unit 53, and the normal electric potential counter 54. Thereby, the processing module 60 outputs the control signal to the driving module 70 according to one or a combination of the number of times the operating electric potential V2 appears, the duration of each normal electric potential V1, the duration of each operating electric potential V2 and the number of times the normal electric potential V1 appears in the detection result of the detection signal, so as to control the rotational speed, stop or rotational direction of the brushless DC motor 20.

Figure 9:
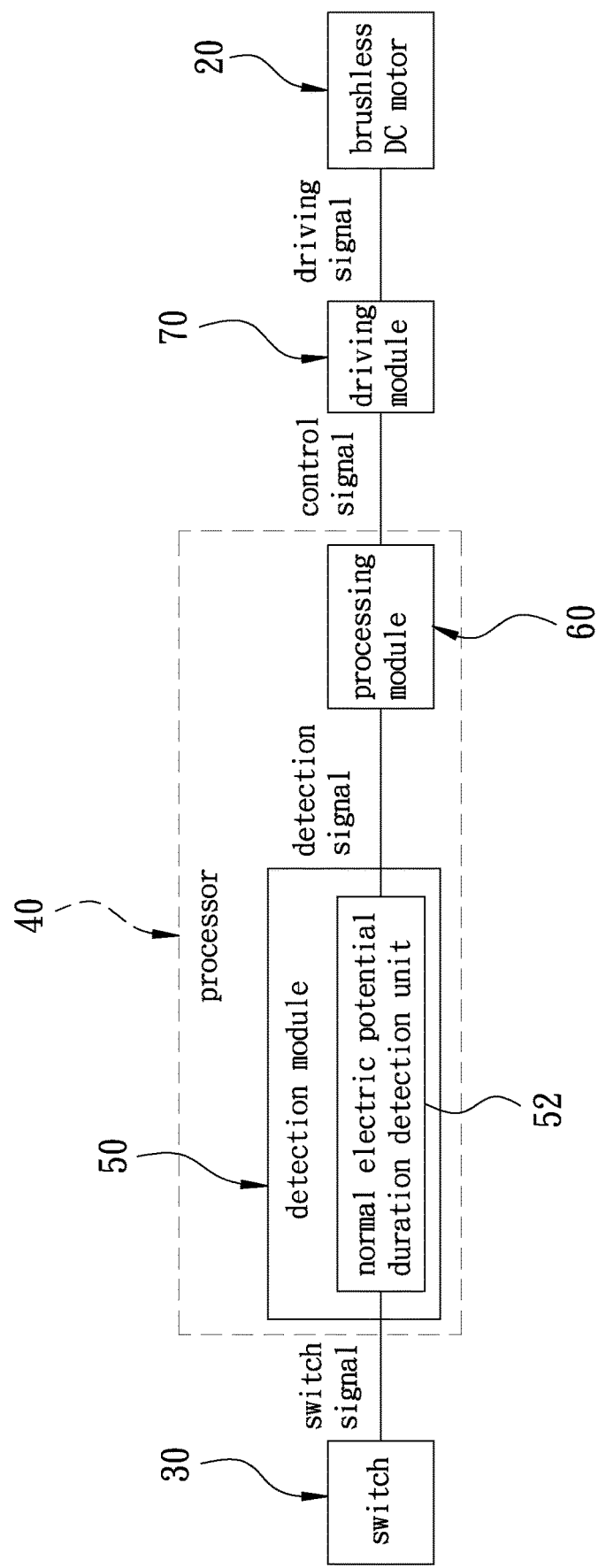
FIG. 9 is a block diagram according to a sixth embodiment of the present invention.

FIG. 9 is a block diagram according to a sixth embodiment of the present invention. The sixth embodiment of the present invention differs from the first embodiment in that the detection module 50 further includes a normal electric potential duration detection unit 52. The normal electric potential duration detection unit 52 is configured to detect and time the duration of each normal electric potential V1 of the switch signal. The normal electric potential duration detection unit 52 is electrically connected to the switch 30 and the processing module 60. The detection signal includes the detection result of the normal electric potential duration detection unit 52. Thereby, the processing module 60 outputs the control signal to the driving module 70 according to the duration of each normal electric potential V1 of the detection result of the detection signal, so as to control the rotational speed, stop or rotational direction of the brushless DC motor 20.

Figure 10:
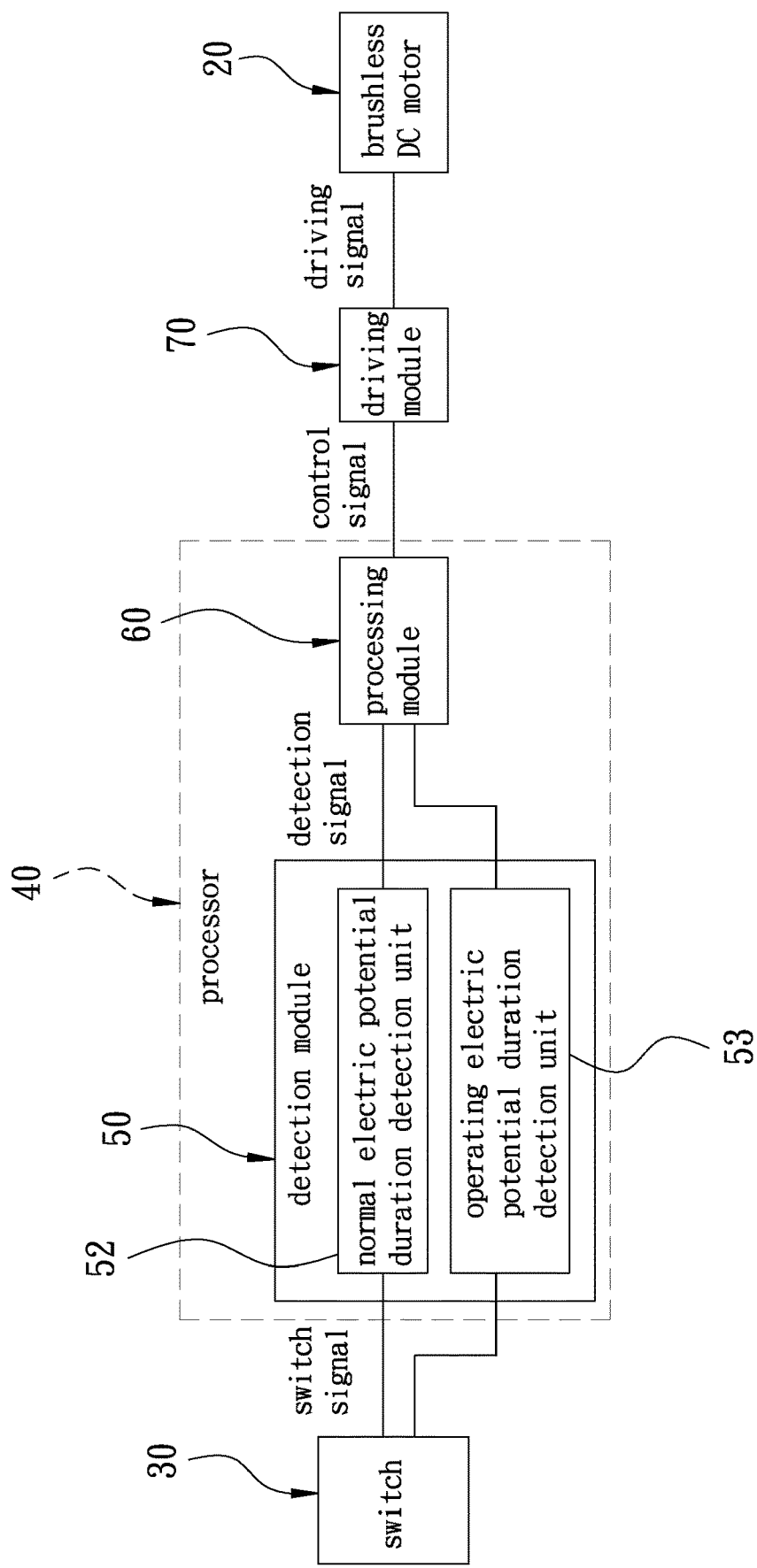
FIG. 10 is a block diagram according to a seventh embodiment of the present invention.

FIG. 10 is a block diagram according to a seventh embodiment of the present invention. The seventh embodiment of the present invention differs from the sixth embodiment in that the detection module 50 further includes an operating electric potential duration detection unit 53. The operating electric potential duration detection unit 53 is configured to detect and time the duration of each operating electric potential V2 of the switch signal. The operating electric potential duration detection unit 53 is electrically connected to the switch 30 and the processing module 60. The detection signal includes the detection result of one or a combination of the normal electric potential duration detection unit 52 and the operating electric potential duration detection unit 53. Thereby, the processing module 60 outputs the control signal to the driving module 70 according to one or a combination of the duration of each normal electric potential V1 and the duration of each operating electric potential V2 of the detection result of the detection signal, so as to control the rotational speed, stop or rotational direction of the brushless DC motor 20.

Figure 11:
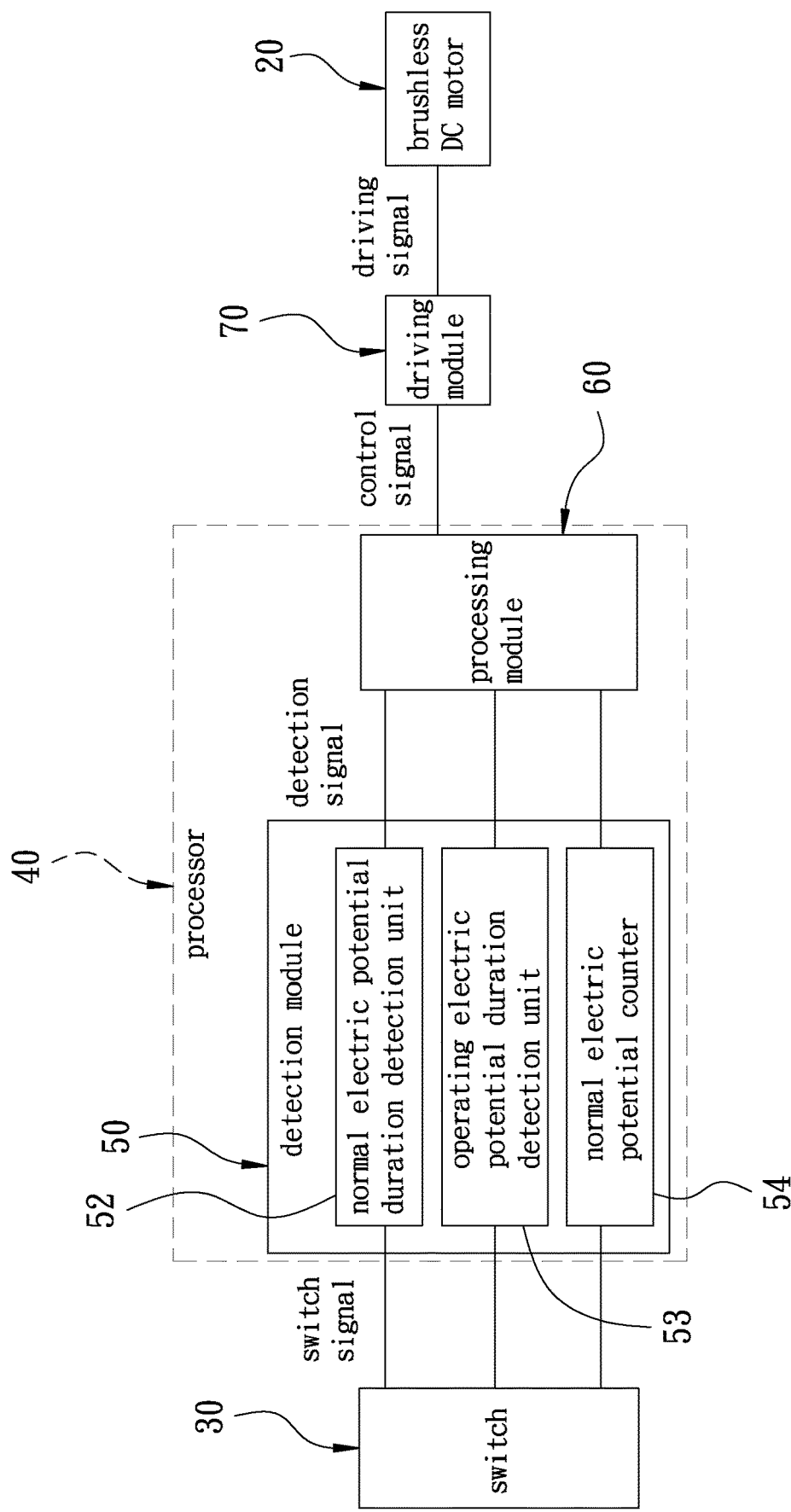
FIG. 11 is a block diagram according to an eighth embodiment of the present invention.

FIG. 11 is a block diagram according to an eighth embodiment of the present invention. The eighth embodiment of the present invention differs from the seventh embodiment in that the detection module 50 further includes a normal electric potential counter 54. The normal electric potential counter 54 is configured to detect and count the number of times the normal electric potential V1 of the switch signal appears. The normal electric potential counter 54 is electrically connected to the switch 30 and the processing module 60. The detection signal includes the detection result of one or a combination of the normal electric potential duration detection unit 52, the operating electric potential duration detection unit 53, and the normal electric potential counter 54. Thereby, the processing module 60 outputs the control signal to the driving module 70 according to one or a combination of the duration of each normal electric potential V1, the duration of each operating electric potential V2 and the number of times the normal electric potential V1 appears in the detection result of the detection signal, so as to control the rotational speed, stop or rotational direction of the brushless DC motor 20.

Figure 12:
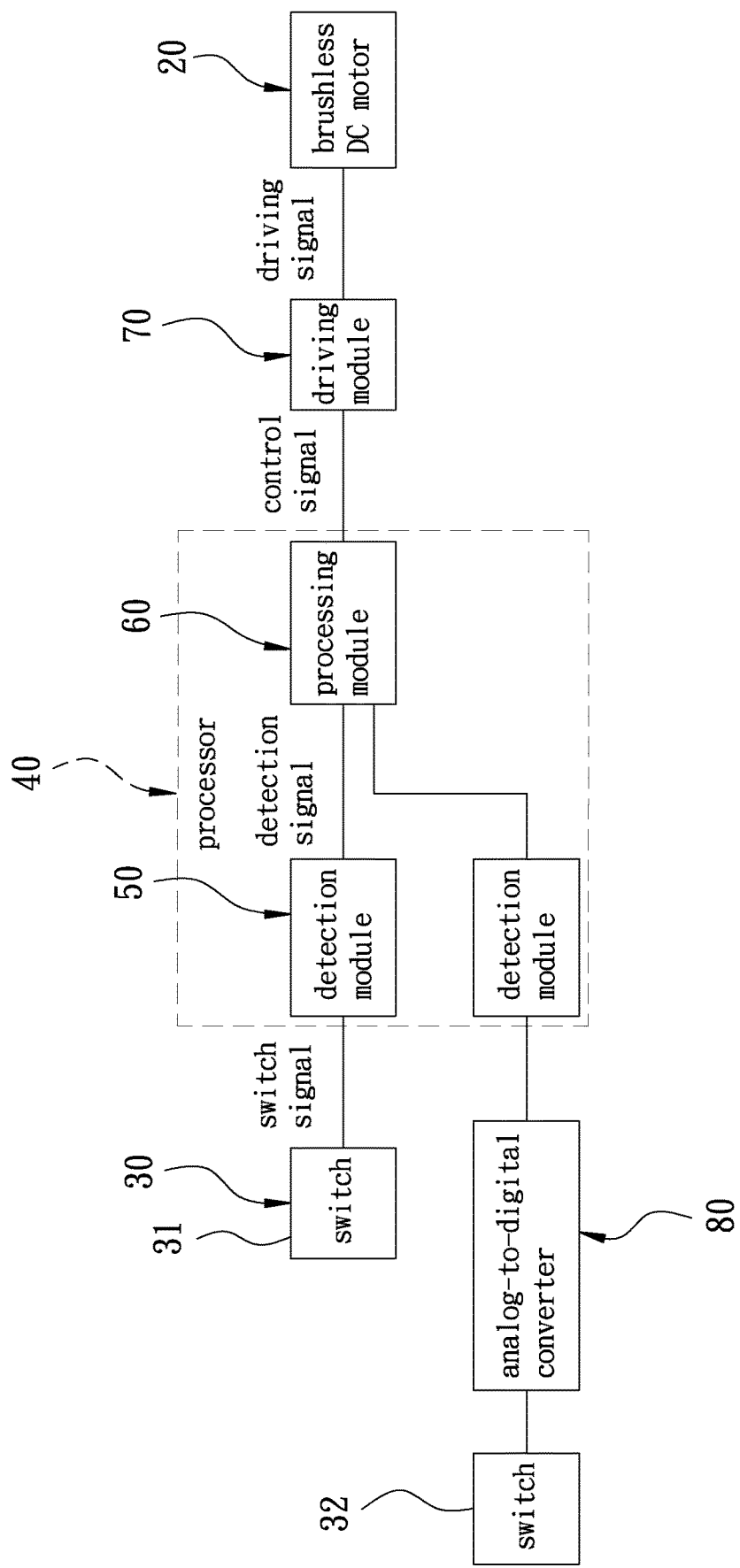
FIG. 12 is a block diagram according to a ninth embodiment of the present invention.

FIG. 12 is a block diagram according to a ninth embodiment of the present invention. The ninth embodiment of the present invention differs from the first to eighth embodiments in that the at least one switch 30 includes two switches defined as a pull switch 31 and a wall-controlled switch 32. The pull switch 31 is connected to a DC power supply. The wall-controlled switch 32 is connected to an AC power supply (not shown). The at least one detection module 50 includes two detection modules. First ends of the detection modules 50 are electrically connected to the pull switch 31 and an analog-to-digital converter 80, respectively. Second ends of the detection modules 50 are electrically connected to the processing module 60, respectively. The analog-to-digital converter 80 is electrically connected to the wall-controlled switch 32. The at least one detection module 50 has been disclosed in the foregoing embodiments. Therefore, this paragraph omits the description and illustration of the operating electric potential counter 51, the normal electric potential duration detection unit 52, the operating electric potential duration detection unit 53, and the normal electric potential counter 54.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A brushless DC motor control device for a ceiling fan, electrically connected to a brushless DC motor, the brushless DC motor control device comprising:

at least one switch, having a switch signal, wherein when the switch is not actuated, an electric potential of the switch signal is a normal electric potential; when the switch is actuated, the electric potential of the switch signal is an operating electric potential;

a processor, including at least one detection module and a processing module, the detection module being electrically connected to the switch and the processing module, the switch transmitting the switch signal to the detection module, the detection module having a detection signal, the detection module transmitting the detection signal to the processing module, the processing module having a control signal, the processing module outputting the control signal according to the detection signal of the detection module; and a driving module, electrically connected to the processing module and the brushless DC motor, the processing module transmitting the control signal to the driving module, the driving module having a driving signal, the driving module outputting the driving signal according to the control signal, the driving module transmitting the driving signal to the brushless DC motor, the driving signal being used to control a rotational speed, stop and rotational direction of the brushless DC motor, wherein the detection module includes an operating electric potential counter and a normal electric potential duration detection unit, the operating electric potential counter is electrically connected to the switch and the processing module and configured to detect and count the number of times the operating electric potential of the switch signal appears, the normal electric potential duration detection unit is electrically connected to the switch and the processing module and configured to detect and time a duration of each normal electric potential of the switch signal, and the detection signal includes the detection result of one or a combination of the operating electric potential counter and the normal electric potential duration detection unit.

2. The brushless DC motor control device as claimed in claim 1, wherein the detection module further includes an operating electric potential duration detection unit, the operating electric potential duration detection unit is configured to detect and time a duration of each operating electric potential of the switch signal, the operating electric potential duration detection unit is electrically connected to the switch and the processing module, and the detection signal includes the detection result of one or a combination of the operating electric potential counter, the normal electric potential duration detection unit and the operating electric potential duration detection unit.

3. The brushless DC motor control device as claimed in claim 2, wherein the detection module further includes a normal electric potential counter, the normal electric potential counter is configured to detect and count the number of times the normal electric potential of the switch signal appears, the normal electric potential counter is electrically connected to the switch and the processing module, and the detection signal includes the detection result of one or a combination of the operating electric potential counter, the normal electric potential duration detection unit, the operating electric potential duration detection unit, and the normal electric potential counter.

4. The brushless DC motor control device as claimed in claim 1, wherein the at least one switch includes two switches defined as a pull switch and a wall-controlled switch, the pull switch is connected to a DC power supply, the wall-controlled switch is connected to an AC power supply, the at least one detection module includes two detection modules, first ends of the two detection modules are electrically connected to the pull switch and an analog-to-digital converter respectively, second ends of the two detection modules are electrically connected to the processing module respectively, and the analog-to-digital converter is electrically connected to the wall-controlled switch.

* * * * *